Dec. 1, 1970    M. C. SZE ETAL    3,544,599
PROCESS FOR THE CATALYTIC REACTION OF OLEFINS AND ALCOHOLS
TO ACETALS AND KETALS
Filed April 18, 1968    2 Sheets-Sheet 1

Inventors
Adolph W. Gessner
Morgan C. Sze
By
ATTORNEY

Inventors
Adolph W. Gessner
Morgan C. Sze

United States Patent Office 3,544,599
Patented Dec. 1, 1970

3,544,599
PROCESS FOR THE CATALYTIC REACTION OF OLEFINS AND ALCOHOLS TO ACETALS AND KETALS
Morgan C. Sze, Upper Montclair, and Adolf W. Gessner, Montclair, N.J., assignors to The Lummus Company, Bloomfield, N.J., a corporation of Delaware
Filed Apr. 18, 1968, Ser. No. 722,393
Int. Cl. C07d 13/04
U.S. Cl. 260—340.9                             10 Claims

ABSTRACT OF THE DISCLOSURE

Acetals and ketals are prepared from their corresponding olefins by reacting certain olefins witn primary or secondary polyhydric alcohols and a catalyst system comprising a noble metal compound and a promoter, regenerating the catalyst system and removing water formed during the regeneration before the catalyst system is recycled.

---

This application is related to each of the following applications: Ser. No. 542,473, filed Apr. 14, 1966 of William G. Lloyd now abandoned; and Ser. Nos. 557,658 and 557,745, each of which was filed June 15, 1966, of Morgan C. Sze now abandoned.

This invention relates to a process for the preparation of acetals and ketals. More specifically, the invention relates to a process for preparing acetals and ketals from their corresponding olefins without substantial hydrolysis of the acetals and ketals to their corresponding aldehydes or ketones.

Processes for the oxidation of certain olefins in alcoholic media in the presence of noble metal catalysts to form acetals and ketals have been developed in recent years. Such processes are described in the following several applications, and details of such applications are incorporated herein by reference: Ser. Nos. 391,005, filed Aug. 20, 1964; 474,460, 474,461 and 474,506, all filed July 23, 1965 and all now abandoned; 517,981, filed Jan. 3, 1966, now U.S. Pat. No. 3,475,461.

Acetals and ketals are formed as illustrated in the following series of reactions:

(1)
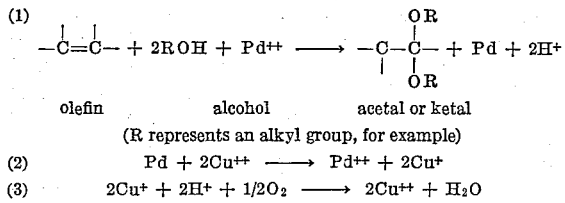

olefin          alcohol           acetal or ketal (R represents an alkyl group, for example)

(2)            $Pd + 2Cu^{++} \longrightarrow Pd^{++} + 2Cu^+$ (3)        $2Cu^+ + 2H^+ + 1/2 O_2 \longrightarrow 2Cu^{++} + H_2O$ Thus, a palladium compound such as palladous chloride is used in the catalyst system, and is reduced to palladium metal as shown by reaction (1). Inclusion of a suitable promoter or redox material such as cupric chloride in the reaction charge makes possible regeneration of the palladous compound, as indicated by reaction (2). In order that the redox material can be restored, an active oxygen-containing gas is employed, as shown by Equation 3.

Water formed in reaction (3), and any water present in the alcohol charge in reaction (1), can operate to hydrolyze the desired acetal or ketal to the corresponding aldehyde or ketone, respectively, as indicated by reaction (4) following:

(4)
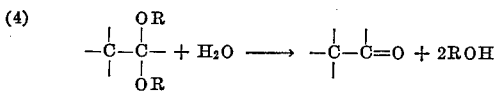

Thus, when the desired products are acetals or ketals, reaction (4) should be suppressed or obviated.

In accordance with the present invention, there is provided a process for forming an acetal from an olefin having the formula (A)
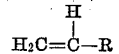

or a ketal from an olefin having the formula (B)
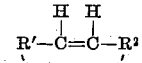

wherein R is selected from the group consisting of hydrogen and aryl, halogen or cyano, R' is an alkyl group and R² is alkyl or hydrogen, which comprises:

(a) Contacting the olefin with a polyhydric alcohol, and a catalyst system comprising a catalytic amount of a compound of a noble metal of Group VIII of Mendeleeff's Periodic Table and a redox material in a higher valence state, in the substantial absence of water, to form a reaction product $P_1$ containing an acetal or ketal, noble metal ion and redox material of lower valence state;

(b) Separating said acetal or ketal from said reaction product $P_1$;

(c) Contacting said reaction product $P_1$ substantially free of said acetal or ketal with an active oxygen-containing gas to form reaction product $P_2$ containing said noble metal compound, regenerated redox material of higher valence state from the redox material of lower valence state, and water;

(d) Removing water from reaction product $P_2$; and (e) Recycling to (a) substantially water-free reaction product $P_2$.

Another embodiment of the invention comprises contacting the reaction product $P_1$ with a substantially oxygen-free vapor having a greater or lesser volatility than the acetal or ketal, fractionating the resulitng vapor and recovering the acetal or ketal.

A further embodiment involves contacting of the reaction product $P_1$ with a solvent having a greater solubility for the acetal or ketal than for the polyhydric alcohol, distilling the resulting extract and recovering the acetal or ketal.

Still another embodiment, when the polyhydric alcohol employed has a relatively low volatility, comprises contacting the reaction product in (c), with an inert fluid heat carrier, and separating in (d) water and said heat carrier as vapor from the reaction product $P_2$.

The invention is illustrated by several typical drawings, wherein

Figure 1:
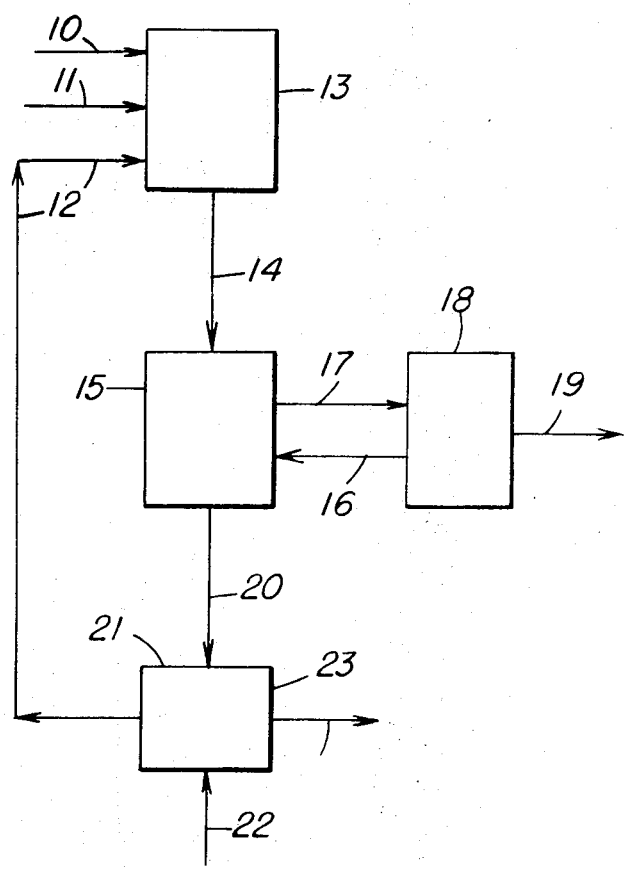
FIG. 1 is a block diagram representative of a continuous process of this invention.

Acetals are formed herein from an olefin having the formula (A)
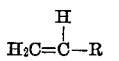

and ketals from an olefin having the formula (B)
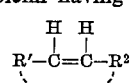

wherein R is selected from the group consisting of hydrogen and aryl, halogen or cyano, R' is an alkyl group and R² is hydrogen or alkyl. Olefins suitable for conversion to their corresponding acetals include: ethylene, styrene, vinyl chloride and acrylonitrile. Suitable olefins for the production of ketals include: butene-1, butene-2, pentene-2, 2-methyl-2-butene, 1-hexene, 2-hexene and cyclohexene.

Polyhydric, primary and secondary alcohols are used herein. Typical alcohols include ethylene and propylene glycols. When an alpha, beta-dihydric alcohol is employed with olefin (A), the product is a particular type of acetal, namely, a dioxolane. When an alpha, gamma-glycol is so employed, the product is another particular type of acetal, namley, a dioxane.

Generally, at least about two molar proportions of an alcohol are used for each molar proportion of unsaturated compound. Preferably, from 3 to 10 proportions of alcohol are used.

The amount of water used with the alcohol and the catalyst system in step (a) should be minimized. Less than about 3 percent by volume of water, and preferably below 1 percent, should be present in the materials contacted in step (a).

In the catalyst systems used herein, a compound of a noble metal of Group VIII of Mendeleeff's Periodic Table is used in catalytic amount. Typical of such metals are: palladium, iridium, ruthenium, rhodium, platinum and osmium. The metals are used in the form of a metal compound. Anions associated with the metals can be of a wide variety, with halides being preferred. Catalytic amounts of metal compound will generally be from about 0.001 to about 0.04 molar proportion, based upon the unsaturated compound. Economic considerations mitigate against the use of large quantities of metal compound.

The noble metal compound is preferably used with a promoter having an oxidation potential sufficient to change the valence of the noble metal from a lower to a higher valence state. Representative and preferred of such promoters is cupric chloride. Others include such redox systems as compounds of metals having various oxidation stages, namely: compounds of copper, silver, tin, lead, cerium, mercury, nickel and iron. Anions associated with the metals can be of a wide variety, including nitrates and acetates, with preference being accorded to halides and, particularly, to chlorides. Representative of such promoters are: cupric chloride, bromide, fluoride, acetate, citrate, acetylacetonate, benzoate, ferrocyanide, and nitrate; cuprous iodide, thiocyanate and cyanide; ferric and ferrous chlorides; mercuric chloride; cobaltous chloride; and silver acetate. The molar ratio of promoter to noble metal compound is from about 0.1:1 to about 100:1.

Vicinal diketones are particularly advantageous promoters, as shown in applications Ser. Nos. 474,460 and 474,506 mentioned above. Typical of such diketones are: 1,2-butanedione; 2,3-butanedione (diacetyl); 3,4-hexanedione; and 1,2-diphenylethanedione (benzil).

Thus, diketone promoters include vicinal diketones and diketones in which the keto groups are separated by a

group.

Compounds capable of oxidation to vicinal diketones are also useful as promoters. Such compounds are illustrated by: acetoin (which is oxidized to diacetyl) and benzoin (which is oxidized to benzil).

Particularly preferred promoters are benzil and chloranil.

Concentration of vicinal diketone or its precursor ranges from about 1:1 to about 100:1, based upon the noble metal compound.

Iodine is also useful as a promoter.

Although not essential, it is generally desirable to include in the catalyst system a small amount of an acid, such as halogen acid. The acid serves to solubilize the noble metal compound in the alcohol. Hydrochloric acid can be used with palladous chloride and cupric chloride.

Cosolvents can be used with an alcohol. Suitable cosolvents are: dimethylformamide, perchloroethylene, chlorobenzene, dioxane, acetonitrile, dialkyl ethers, esters of carboxylic acids, benzene and other aromatic hydrocarbons.

In addition, certain inhibitors can be included with the reaction system described above. The inhibitors serve to suppress side reactions particularly at relatively high reaction temperatures. Such inhibitors are described in detail in application Ser. No. 517,981 mentioned above, and include:

a monohydric aromatic hydrocarbon: phenol, nordihydroquaiaretic acid; alkylated phenols such as p-cresol, p-octylphenol and 2,6-ditertiarybutyl-4-methylphenol; and halogenated phenols such as 2,4,6-tribromophenol;

an etherphenol such as p-methoxyphenol and p-benzoyloxyphenol;

a polyhydric aromatic hydrocarbon such as hydroquinone, catechol and pyrogallol, and alkylated and halogenated derivatives thereof such as tetrafluorohydroquinone;

a quinone and its alkylated and halogenated derivatives such as quinone, 1,4-naphthoquinone and chloranil;

a phenolic and an alcoholic acid such as digallic acid and ascorbic acid; and a tertiary amine such as triphenylamine.

The reactor is a vessel shaped such as to insure complete conversion of the unsaturated reactant in the presence of a large stoichiometric excess of alcohol and some excess of redox ion, such as $Cu^{++}$. When the unsaturated compound is a gas (e.g. ethylene, propylene, vinyl chloride) at the reactor temperature and pressure, it is advantageous to use a tall vertical vessel and to disperse the gaseous unsaturated compound into an alcohol/catalyst solution near the base so as to let it bubble up through the catalyst solution. The acetal or ketal will form and dissolve in the alcohol.

When the unsaturated compound is a liquid at reactor temperature and pressure (e.g. cyclohexene), it may be fed to the vertical reactor countercurrently in the same manner as a gas is fed if its specific gravity is appreciably lower than that of the alcohol-catalyst solution. If its specific gravity is comparable to that of the alcohol-catalyst solution, the reactor orientation is unimportant. But in all instances, a large interfacial area between the two liquid phases is provided to insure high reaction rates. This may be accomplished by injection of the feed through many small orifices, by mechanical agitation, or by turbulence generated by internal obstructions such as baffles.

The reactor temperature is from about 50° C. to about 80° C. For normally gaseous feeds, the pressure may be elevated to 10–20 atmospheres (absolute) to increase reaction rates. In some instances, normally gaseous feeds will be liquids at such elevated pressures.

Oxygen or an active oxygen-containing gas, such as air, is used in reaction (3). Generally, the quantity of oxygen available in this reaction will range from a stoichiometric quantity to a slight excess. Oxygen pressure is generally from atmospheric to about 250 pounds per square inch gauge (p.s.i.g.).

Reference is now made to the drawings and representative examples, in order to further illustrate the invention.

As shown in FIG. 1, a polyhydric alcohol in line 10, an olefin in line 11 and regenerated catalyst solution in line 12 are charged to reactor 13 wherein reactions (1) and (2) are effected. The resulting reaction mixture formed in reactor 13 is passed through line 14 to a suitable stripper 15 wherein the acetal or ketal formed in 13 is separated from the reaction mixture when contacted with a suitable stripping agent from line 16. The acetal or ketal and stripping agent are passed from stripper 15 through line 17 to vessel 18. In the latter, the acetal or ketal is separated from the stripping agent and is removed through line 19. The stripped reaction mixture obtained in stripper 15 is passed through line 20 to catalyst regenerator 21, wherein it is in contact with a free oxygen-containing gas which is charged via line 22. Regenerated catalyst solution is removed from regenerator 21 through line 12, and water formed in regenerator 21 is removed therefrom via line 23.

EXAMPLE 1

Ethylene is bubbled through a solution of $CuCl_2$ and $PdCl_2$ in ethylene glycol at 70° C. and 3 atmospheres (absolute) in a vertical tower. For each gram-mole of ethylene, a mixture of 3100 gms. of ethylene glycol, 403.5 gms. of $CuCl_2$ and 16 gms. of $PdCl_2$ enter the reactor. The ethylene is completely consumed by reaction (1) and forms 88 gms. of 2-methyl-1,3-dioxolane, which is contained in the liquid effluent of the reactor. The $CuCl_2$ is partially converted to CuCl and HCl.

Acetals and ketals formed as described above can be separated from their corresponding reaction mixtures by vapor stripping or by solvent extraction. Ease of separation is dependent upon several factors, such as relative volatilities of the acetals and ketals and the alcohol employed in their preparation, and relative solubilities of the acetals and ketals in the solvents employed. Acetals and ketals of dihydric alcohols are generally easier to separate and to isolate than acetals and ketals of monohydric alcohols.

Many acetals and ketals of dihydric alcohols are much more volatile than the alcohols themselves. For example, the acetal formed from ethylene and ethylene glycol, 2-methyl-1,3-dioxolane,

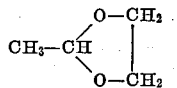

has a normal boiling point of 82° C., and ethylene glycol has a normal boiling point of 197° C. Such acetals and ketals are stripped from the reactor effluent mixture by a gas or vapor, which must be substantially oxygen-free to avoid occurrence of reactions (3) and (4).

The following Examples 2 and 3 illustrate vapor stripping systems for 2-methyl-1,3-dioxolane employing 2-methyl pentane, which is more volatile than the dioxolane, and n-octane, which is less volatile.

EXAMPLE 2

Figure 2:
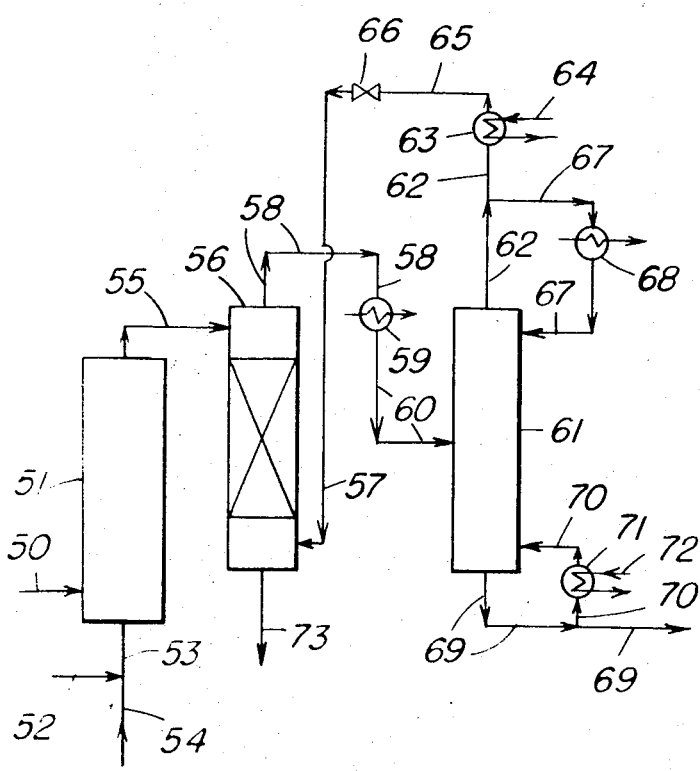
FIG. 2 is a schematic flow diagram in which a substantially oxygen-free vapor having a greater volatility than the desired product, an acetal, is employed.

Referring to FIG. 2, ethylene (1 gram-mole) in line 50 is charged to reactor 51. Ethylene glycol (62 grams), is passed through line 52 to line 53, wherein it is mixed with a mixture of cupric chloride (403.5 grams) and palladous chloride (16 grams) dissolved in ethylene glycol (3038 grams) entering from line 54. The mixture in line 54 can be a fresh catalyst system or, preferably for a continuous operation, is a regenerated catalyst system. The resulting mixture in line 53 is passed into the bottom of reactor 51 and is in contact with the ethylene charge at about 70° C. The ethylene and ethylene glycol are converted in reactor 51 to 2-methyl-1,3-dioxolane.

The reaction product in reactor 51 comprising the dioxolane, excess ethylene glycol, palladium chloride, cupric chloride and cuprous chloride, is passed through line 55 to stripping column 56. The column (56) is operated at about 70° C. and 400 mm. pressure (Hg, absolute). 2-methyl pentane (3300 grams) is charged from line 57 to a lower portion of column 56, and as 2-methyl pentane vapor flows upwardly therein stripping the dioxolane from the reaction mixture charged via line 55. The dioxolane and 2-methyl pentane vapors are removed from column 56 through overhead line 58, and are passed through water-cooled condenser 59, whereupon the dioxolane and 2-methyl pentane are condensed and cooled to about 30° C. The condensate is then passed through line 60 to distillation column 61, which is operated at about 60–65° C. and 760 mm. pressure (Hg, absolute). The normal boiling point of 2-methyl pentane is 60.3° C. The liquid pressure can be increased from 400 mm. in stripper 56 to 760 mm. in distillation column 61 by including a pump (not shown) in line 60 or by providing for an elevation differential (not shown) between units 56 and 60.

2-methyl pentane is removed from column 61 through overhead line 62. It is then superheated to about 75° C. in passing through heater 63, which is heated by steam coil 64 therein. The superheated 2-methyl pentane is then passed through line 65 controlled by valve 66, whereby pressure is reduced to about 400 mm. (Hg, absolute); it is then passed through line 57 to stripper 56. A portion of the 2-methyl pentane is diverted from line 62 through line 67 containing condenser 68 to an upper portion of column 61 to serve as reflux therein.

Substantially pure dioxolane is removed from column 61 via bottom line 69. A portion of the dioxolane is returned to a lower portion of column 61 as reboiled vapor through line 70 containing heater 71 which is heated by steam line 72.

Dioxolane-free catalyst solution, containing palladium chloride and cupric and cuprous chloride, is removed from stripper 56 through bottom line 73 to a regeneration system (not shown).

Instead of 2-methyl pentane, any one or more of the following can be utilized: normal hexane, normal pentane, neohexane and isopentane.

EXAMPLE 3

With referece to FIG. 3, 50–56 are the same as corresponding items in FIG. 2. Here again ethylene and ethylene glycol are reacted to form 2-methyl-1,3-dioxolane in reactor 51 and the resulting reaction mixture is passed through line 55 to an upper portion of stripper 56. n-Octane (1600 grams) in vapor state is passed into a lower portion of stripper 56 through line 100. The n-Octane strips the dioxolane from the reaction mixture, as the stripper (56) is operated at about 80° C. and 150 mm. pressure (Hg, absolute). The resulting dioxolane-n-Octane vapor mixture is taken from stripper 56 through overhead line 101 containing condenser 102 wherein it is condensed and subcooled to about 65° C. n-Octane has a boiling point of 125.6° C. at 760 mm. The pressure of the condensate is increased to about 200 mm. (Hg, absolute) by elevation difference between stripper 56 and distillation column 103, or by means of a pump (not shown) in line 101. The condensate in line 101 is passed into an intermediate zone of column 103, which is operated at 200 mm. pressure (Hg, absolute). Substantially pure dioxolane is removed from fractionator 103 thorugh overhead line 104, condenser 105 and line 106. A portion of the dioxolane from condenser 105 is returned through line 107 to an upper section of fractionator 103 to serve therein as reflux.

n-Octane is removed as a bottoms product from fractionator 103 through line 108. It is passed through heater 109, heated by steam line 110, to line 111 controlled by valve 112 and is then passed through line 100 to stripper 56. Valve 112 serves to reduce the pressure of the n-octane stream to about 150 mm. (Hg, absolute). A portion of the n-octane in line 111 is passed through line 113 to a lower section of column 103 as reboiled vapor.

Dioxolane-free catalyst solution is removed from stripper 56 through bottom discharge line 73, as in FIG. 2.

Figure 3:
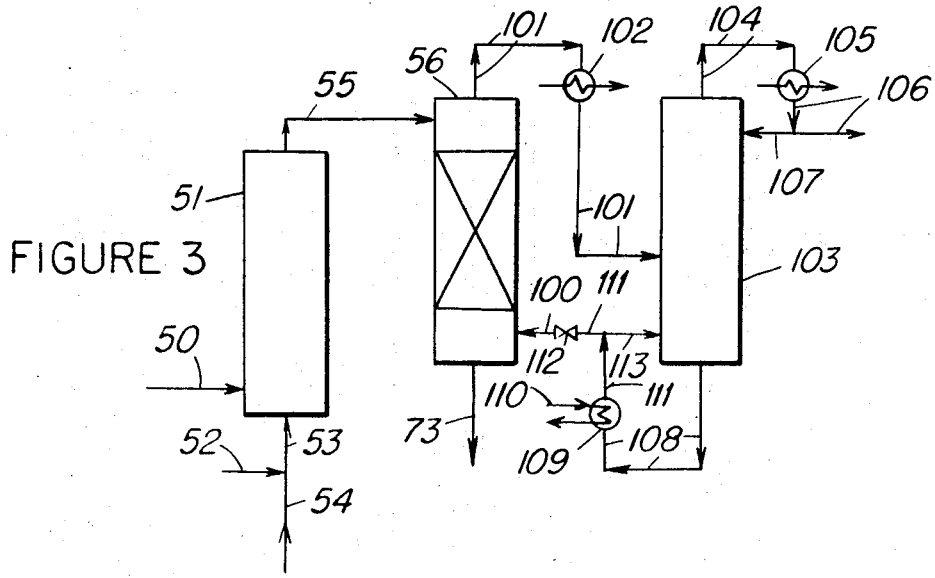
FIG. 3 is another schematic flow diagram in which a substantially oxygen-free vapor having a lesser volatility than the desired acetal product is employed.

Other inert stripping agents can be used in the technique illustrated by FIG. 3. In place of n-octane, one or more of n-nonane, isooctane and methylcyclohexane can be employed.

Certain acetals and ketals have been found to be much more soluble in solvents such as paraffinic hydrocarbons, than are their corresponding alcohols from which they are prepared. Example 4 following illustrates an acetal separation system employing solvent extraction.

EXAMPLE 4

Figure 4:
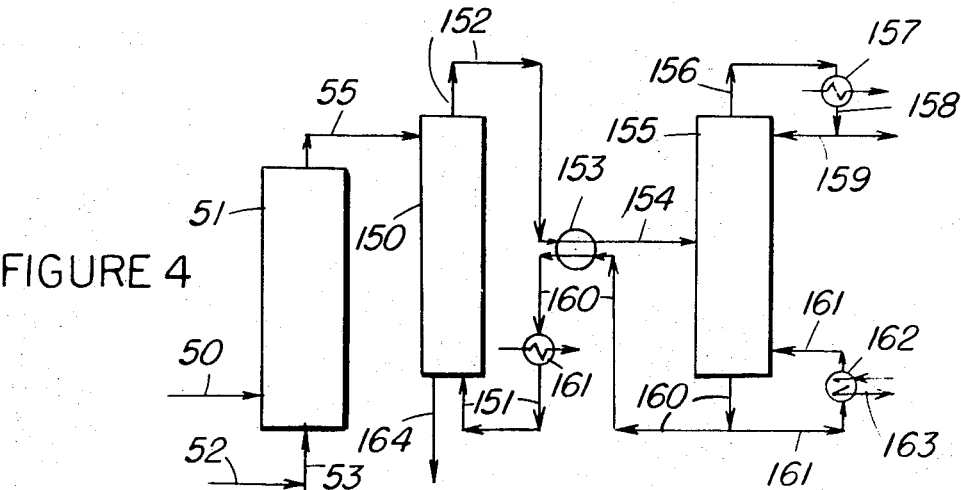
FIG. 4 shows another schematic flow diagram in which a solvent having a greater solubility for the acetal product than for the polyhydric alcohol charged is used.

Equipment in FIG. 4 designated by 50–55 is identical with equipment similarly designated in FIGS. 2 and 3, already described. Ethylene and ethylene glycol are similarly reacted to form 2-methyl-1,3-dioxolane. The reaction mixture in line 55 is passed into an upper section of extraction column 150 maintained at about 70° C. n-Dodecane having a normal boiling point of 216° C., is passed countercurrently to the reaction mixture in column 150 via line 151.

The mutual solubility of ethylene glycol and n-dodecane is negligible and the distribution ratio of 2-methyl-1,3-dioxolate is $$\frac{(X_{\text{Dioxolane}}) \text{ in dodecane phase}}{(X_{\text{Dioxolane}}) \text{ in glycol phase}} = 2.5$$

For each gram-mole of ethylene reacting with ethylene glycol, about 5000 grams of n-dodecane enter column 150 and remove substantially all of the dioxolane from the reaction mixture from line 55. The resulting extract is removed from column 150 through line 152, heater 153 wherein it is heated to about 175° C., and line 154 to distillation column 155. The column (155) is operated at substantially atmospheric pressure such that substantially pure dioxolane at about 82° C. is removed through overhead line 156, condenser 157 and line 158. Here again, a portion of the dioxolane is diverted from line 158 through line 159 to an upper section of column 155 to serve therein as reflux.

n-Dodecane is removed from column 155 at about 220° C. as a bottoms product through line 160. It is cooled by heat exchange in passing through heater 153 in line 160, and is cooled further in passing through cooler 161 in line 160. Cooled n-dodecane is then returned to column 150 through line 151 which connects with the outlet side of cooler 161. A portion of the n-dodecane is returned to column 155 as reboiled vapor via lines 160 and 161 containing heater 162. The latter is heated by steam which is passed through coil 163.

Dioxolane-free catalyst solution is removed from column 150 through line 164.

Other suitable solvents for use in the technique illustrated by FIG. 4 include paraffinic hydrocarbon fractions with narrow boiling ranges, e.g., from 200° C. to 220° C., 220–240° C. and 240–260° C.

The spent catalyst solution, from which an acetal or a ketal has been removed by the methods described above, is regenerated with gaseous oxygen to restore the less oxidized ionic species of the redox ion system to the more oxidized state, as indicated above by reaction (3), namely:

(3) $\quad 2Cu^+ + 2H^+ + \frac{1}{2}O_2 \rightarrow 2Cu^{++} + H_2O$

For every gram-mole of acetal or ketal produced, about 62,000 calories of heat are given off by reaction (3). This heat is more than adequate to strip the water formed by reaction (3) out of the reaction mixture thereof, since only about 10,000 calories are needed for this purpose. The remaining 52,000 calories can be removed by vaporization of part of the alcohol in the reaction mixture, if the alcohol is sufficiently volatile; or of a non-reactive heat carrier such as a paraffinic hydrocarbon of suitable volatility, if the alcohol is not sufficiently volatile.

Example 5 illustrates the regeneration of spent catalyst solutions by this method.

EXAMPLE 5

The spent catalyst solution in the preparation of 2-methyl-1,3-dioxolane (Examples 1–4) contains about 3038 grams of ethylene glycol, 134.5 gms. of $CuCl_2$, 198 gms. of CuCl, 73 gms. of HCl and 16 gms. of $PdCl_2$. This solution is regenerated by countercurrent contact at 70° C. with a gas mixture containing slightly more oxygen than stoichiometrically required to complete reaction (3).

Figure 5:
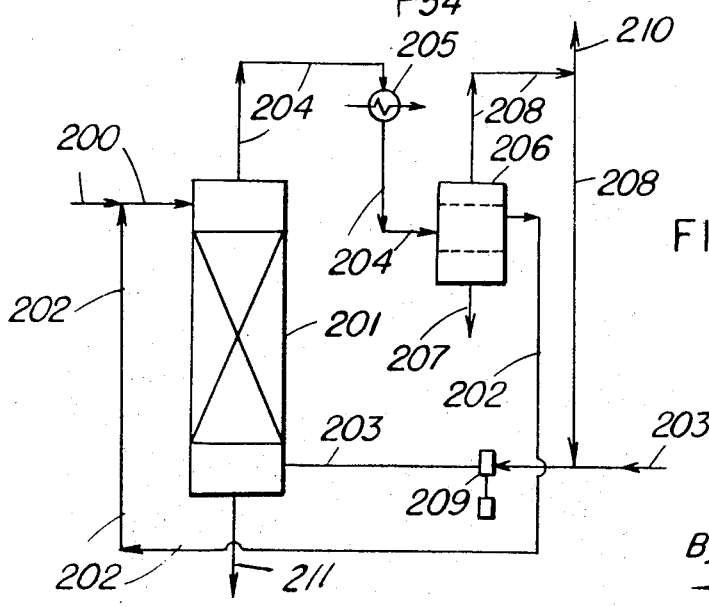
FIG. 5 is another schematic flow diagram in which an inert heat carrier is caused to contact the reaction product in (c).

Referring to FIG. 5, spent catalyst solution in line 200 is passed into an upper section of column 201 which is preferably packed with suitable material such as glass beads, Raschig rings or Berl saddles to provide for excellent contact therein. N-Octane (640 grams) is passed from line 202 to line 200 and mixes with the spent catalyst solution as they pass to column 201. A regenerating gas, such as air or oxygen, is passed from line 203 into a lower section of column 201.

Reaction (3) takes place in column 201. The exothermic heat of the reaction vaporizes the n-octane and the water formed in the reaction. n-Octane and water vapors are removed overhead from column 201 through line 204. They are then condensed and cooled to about 30° C. in passing through condenser 205 located in line 204. The condensate in line 204 is passed into an intermediate section of decantation vessel 206, where n-octane and water phases separate one from the other. Water is removed from vessel 206 through bottom line 207 and is discarded. n-Octane is removed from vessel 206 through line 202 for return to column 201. Uncondensed regenerating gas in line 204 and vessel 206, is passed from the latter through overhead line 208; a portion of this gas is recycled to line 202 by blower 209. The use of the partially spent regenerating gas as recycle insures non-flammable gas mixtures throughout the catalyst regenerating system. A portion of the used regenerating gas can be vented through line 210.

Regenerated catalyst solution in column 201 is removed through line 211 for use in a reactor such as 13 in FIG. 1 or 51 in FIGS. 2–4.

It is to be understood that many modifications can be made within the scope of the present invention without departing from the spirit thereof, and the invention is intended to include all such modifications.

We claim:

1. The process for forming an acetal from an olefin having the formula (A) 

or a ketal from an olefin having the formula (B) 

wherein R is selected from the group consisting of hydrogen and aryl, halogen or cyano; R' is an alkyl group and $R^2$ is alkyl or hydrogen, which comprises:
   (a) contacting the olefin with a polyhydric alcohol and a catalyst system comprising a catalytic amount of a compound of a noble metal of Group VIII of Mendeleeff's Periodic Table and a redox material in a higher valence state, in the substantial absence of water, to form a reaction product $P_1$ containing an acetal or ketal, noble metal ion and redox material of lower valence state;
   (b) separating said acetal or ketal from said reaction product $P_1$;
   (c) contacting said reaction product $P_1$ substantially free of said acetal or ketal with an active oxygen-containing gas to form reaction product $P_2$ containing said noble metal compound and redox material of higher valence state regenerated from the redox material of lower valence state, and water;
   (d) removing water from reaction product $P_2$; and
   (e) recycling to (a) substantially water-free reaction product $P_2$.

2. The process of claim 1 wherein, in (b), said reaction product $P_1$ is contacted with a substantially oxygen-free vapor having a greater volatility than the acetal or ketal therein, the resulting vapor is fractionated and said acetal or ketal is recovered.

3. The process of claim 2 wherein the vapor is a saturated hydrocarbon boiling below the acetal or ketal.

4. The process of claim 1 wherein, in (b), said reaction product $P_1$ is contacted with a substantially oxygen-free vapor having a lesser volatility than said acetal or ketal therein, the resulting vapor is fractionated and said acetal or ketal is recovered.

5. The process of claim 4 wherein the vapor is a saturated hydrocarbon boiling above the acetal or ketal.

6. The process of claim 1 wherein, in (b), said reaction product $P_1$ is contacted with a solvent having a greater solubility for said acetal or ketal than for said polyhydric alcohol, the resulting extract is distilled and said acetal or ketal is recovered.

7. The process of claim 6 wherein the solvent is n-dodecane.

8. The process of claim 6 wherein the solvent is a saturated hydrocarbon mixture boiling within the range of from about 200 to about 260° C.

9. The process of claim 1 wherein a polyhydric alcohol of relatively high volatility is employed, is volatilized by the heat of reaction of (c) and is thereby removed from reaction product $P_2$.

10. The process of claim 1 wherein a polyhydric alcohol of relatively low volatility is employed and said reaction product $P_1$ is so contacted in (c) with an inert fluid heat carrier and said heat carrier and water are separated in (d) as vapor from the reaction product $P_2$.

References Cited

UNITED STATES PATENTS 3,346,624   10/1967   Schaeffer et al.   _____ 260—497

OTHER REFERENCES

Moiseev et al.: "Chemical Abstracts," vol. 62 (1965), col. 6396(a) (Abstract of U.S.S.R. Pat. No. 165,436, Nov. 12, 1964.

ALEX MAZEL, Primary Examiner

J. H. TURNIPSEED, Assistant Examiner

U.S. Cl. X.R.

260—338, 340.7